United States Patent [19]

Mead et al.

[11] Patent Number: 5,059,814
[45] Date of Patent: Oct. 22, 1991

[54] WINNER-TAKE-ALL CIRCUITS FOR NEURAL COMPUTING SYSTEMS

[75] Inventors: Carver A. Mead; John Lazzaro; M. A. Mahowald; Sylvie Ryckebusch, all of Pasadena, Calif.

[73] Assignee: The California Institute of Technology, Pasadena, Calif.

[21] Appl. No.: 277,795

[22] Filed: Nov. 30, 1988

[51] Int. Cl.⁵ .................. H03K 3/013; H03K 3/353; H03K 17/687; G06F 13/00
[52] U.S. Cl. ............................. 307/201; 307/584; 307/448; 364/513; 381/41; 381/68.2; 323/317
[58] Field of Search ............... 307/201, 304, 328, 584, 307/451, 450, 270, 448; 381/110, 41–44, 47, 68; 340/825.11, 825.17; 364/513, 148; 350/96.1; 323/316, 317

[56] References Cited

U.S. PATENT DOCUMENTS

| | | | |
|---|---|---|---|
| 4,419,544 | 12/1983 | Adelman | 381/68.2 X |
| 4,536,844 | 8/1985 | Lyon | 381/68.2 X |
| 4,637,402 | 1/1987 | Adelman | 381/23.1 X |
| 4,660,166 | 4/1987 | Hopfield | 307/201 X |
| 4,786,818 | 11/1988 | Mead et al. | 307/328 X |
| 4,809,193 | 2/1989 | Jourjine | 350/96.1 X |

Primary Examiner—Stanley D. Miller
Assistant Examiner—David R. Bertelson
Attorney, Agent, or Firm—Donald A. Streck; Edward O. Ansell; Elgin Edwards

[57] ABSTRACT

A CMOS analog integrated circuit comprising a plurality of nodes for simultaneously computing the largest of the signals at inputs of the nodes. There is a common line supplying current and producing a maximum voltage potential and a plurality of nodes connected to the common line. Each node comprises a follower transistor having a source operably connected to the common line for sourcing current and a gate being the input of the node and being connected to a current signal input source providing a current signal to the node to be compared to the current signals at respective ones of the other nodes. There is an inhibitor transistor having a gate connected to the common line and a drain operably connected to the gate of the follower transistor. The inhibitor transistor provides the voltage output of the node and inhibits the voltage output at all nodes connected to the common line which have a current signal which is smaller than the largest current signal connected to one of the nodes. A plurality of non-linear resistors may be disposed in the common line between respective ones of the nodes of limit current flow therebetween and thereby form subgroups having a single "winner" with each subgroup. A slope limiting transistor may be diode-connected in series with the inhibitor transistor to limit the slope of the voltage output from the inhibitor transistor.

12 Claims, 4 Drawing Sheets

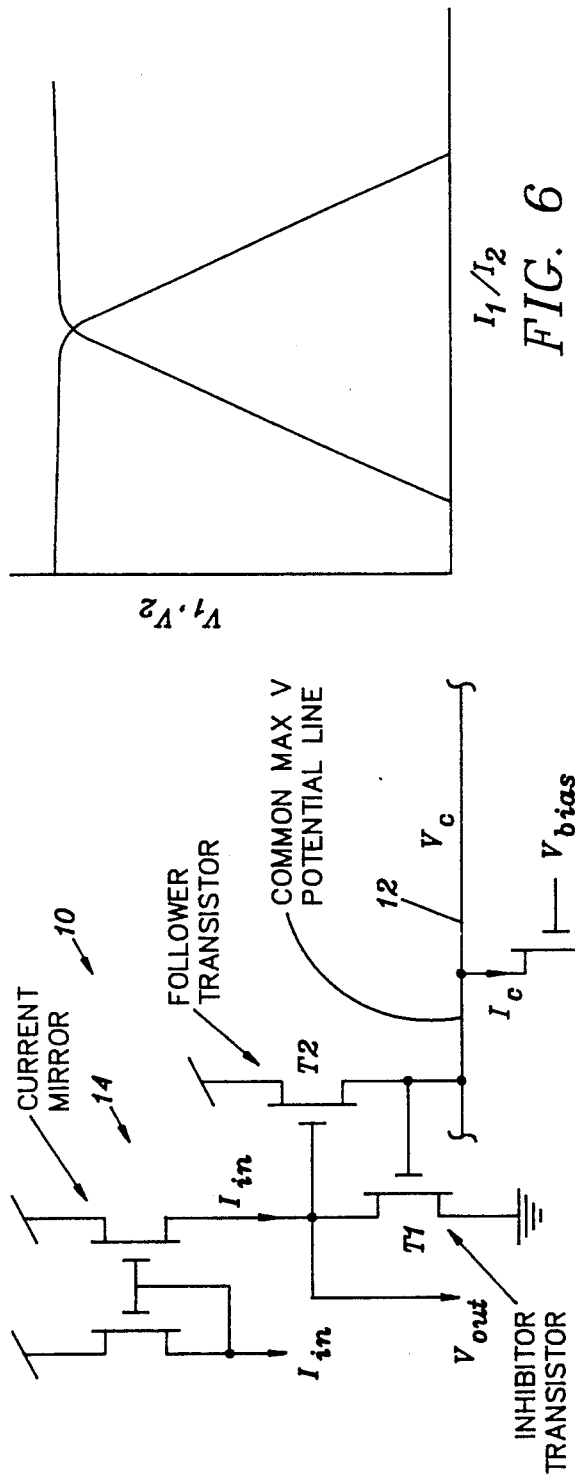
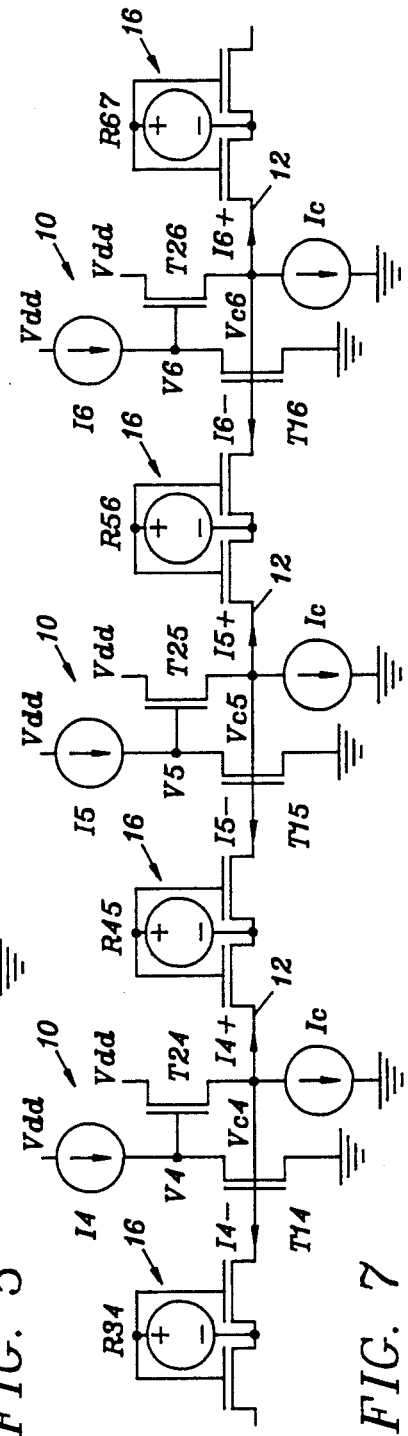
FIG. 6
FIG. 5
FIG. 7

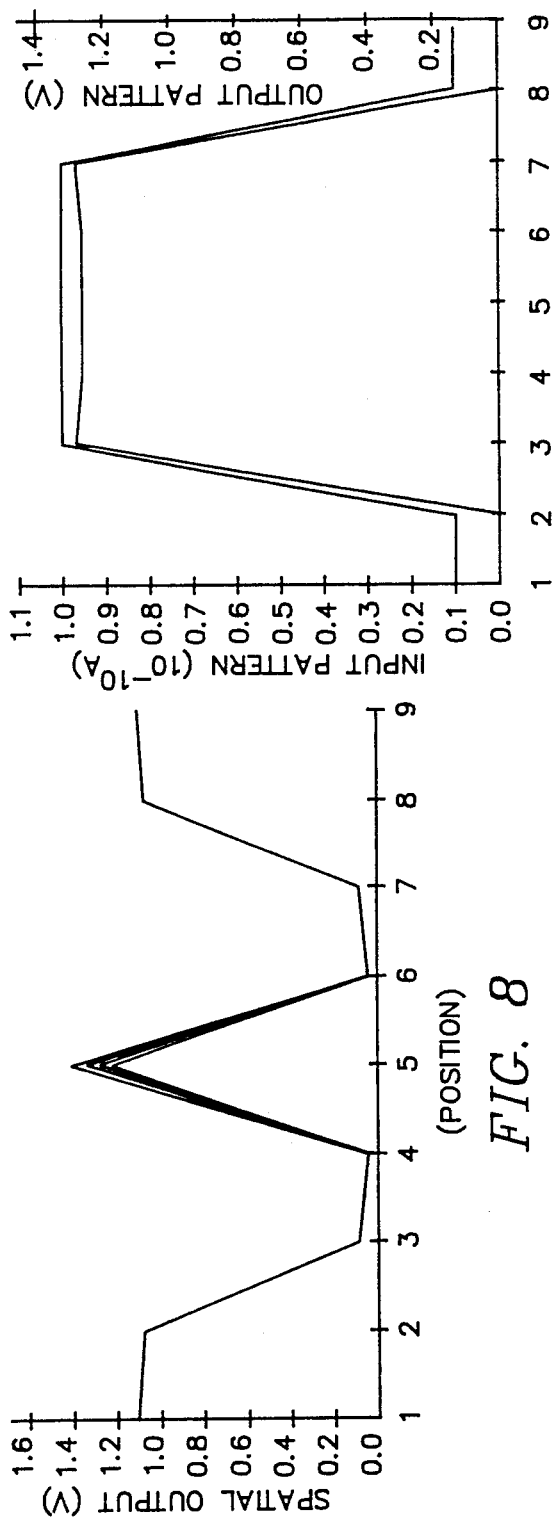

WINNER-TAKE-ALL CIRCUITS FOR NEURAL COMPUTING SYSTEMS

BACKGROUND OF THE INVENTION:

The present invention relates to neural-emulating computing systems and, more particularly, to a neural computing network including a plurality of neural circuits and producing a single winner-take-all output at the "winning" circuit comprising, a common line supplying current and producing a maximum voltage potential; and wherein each neural circuit comprises, follower transistor means operably connected to the common line for sourcing current, the follower transistor means including gate means for connection to a current signal input source providing a current signal to each neural circuit to be compared to the current signals at respective ones of the other neural circuits; and, inhibitor transistor means having a gate operably connected to the common line and being operably connected to the gate means of the follower transistor means for providing a voltage output of the neural circuit at an output thereof and for inhibiting the voltage output at all neural circuits connected to the common line which have a current signal which is smaller than the largest the current signal connected to one of the neural circuits.

Computing systems have gone through several evolutionary processes as the art itself has developed and as new technology has permitted the art to develop in new directions. Much early systems type simulation, testing, and decision making was accomplished employing analog computing devices. While large and cumbersome as well as being tedious to "program" (actually accomplished by physically interconnecting electronic elements by means of plug in wires on a so-called patch board) analog computers did have the advantage of providing decisions by degree. A binary device (such as a switch) is either on or off. It is either black or white, i.e. no degrees of gray. An analog output, on the other hand, covers black, white, and various degrees of gray in between. Thus, one can tell that the answer to a system question is not only true; but, how true—i.e., very true, marginally true, etc.

With the advent of small, fast, easily programmed digital computers and a variety of dependable high level languages, analog computers virtually fell into disuse. While a digital computer operates in serial and, therefore, is not basically adapted to parallel decision making (as are analog computers), with smaller problems, multi-processor configurations are able to fill the bill. This simply means that a plurality of interconnected computers are assigned to work on the same problem simultaneously. In distributed processing environments where a number of computers (often referred to as nodes, workstations, or the like,) are interconnected on a local area network (LAN) it is not unusual to have several hundred nodes working a common problem. So-called "hypercube" systems now in development anticipate having several thousand processors ultimately interconnected and communicating with one another to perform computations in space applications, for example, where such extensive parallel processing is required to provide real-time answers.

In the continuing task of trying to design and construct computers which can duplicate (or at least closely approximate) the human brain in its thinking and learning processes, there has been a switch back towards analog computational techniques because of their closer functional proximity to the brain. The neurons of the brain are interconnected by the synapses to provide a large analog computational capability that provides instant decisional responses to changes in input stimuli in the same manner as an analog computer. The human brain does not perform a concurrent digital computational process on the input data. Thus, much research is presently being accomplished with so-call "neural networks" which are electronic networks which functionally simulate the neurons and synapses of the brain.

A neural network may comprise many many thousands of simulated neurons. Activity in neural systems is mediated by two general types of inhibition: subtractive, which may be thought of as setting the zero level for the computation, and multiplicative (non-linear), which regulates the gain of the computation. What is lacking at this point is circuitry to be included within the simulated neural paths which can provide a general non-linear inhibition in its extreme form, known as winner-take-all—a circuit that will indicate not only the path with the highest input stimulation value but, additionally, provide an indication of the degree of "winning".

Wherefore, it is the object of the present invention to provide a winner-take-all circuit that can be employed in the various paths comprising a neural network computing system, or the like, which will indicate not only the path with the highest stimulation input value at any instant but, additionally, provide an indication of the degree of "winning".

Other objects and benefits of the present invention will become apparent from the detailed description which follows hereinafter when taken in conjunction with the drawing figures that accompany it.

SUMMARY

The foregoing object has been attained by the neural computing circuit of the present invention producing a single winner-take-all output at the "winning" circuit when a plurality of the circuits are simultaneously connected to a common line supplying current and producing a maximum voltage potential wherein the circuit comprises, follower transistor means operably connected to the common line for sourcing current, the follower transistor means including gate means for connection to a current signal input source providing a current signal to each neural computing circuit to be compared to the current signals at respective ones of the other neural computing circuits connected to the common line; and, inhibitor transistor means having a gate operably connected to the common line and being operably connected to the gate means of the follower transistor means for providing a voltage output of the neural circuit at an output thereof and for inhibiting the voltage output at all neural computing circuits connected to the common line which have a current signal which is smaller than the largest current signal connected to one of the neural computing circuits.

In the preferred embodiment, there are also non-linear resistor means for insertion into the common line between respective ones of a plurality of the neural computing circuits to limit current flow therebetween and thereby form subgroups of the neural computing circuits having a single "winner" within each subgroup.

Also in the preferred embodiment, there are slope limiting transistor means diode-connected in series with the inhibitor transistor means for limiting the slope of the voltage output from the inhibitor transistor means.

DESCRIPTION OF THE DRAWINGS

FIG. 5 is a more detailed drawing of one neuron in a network according to the present invention.

FIG. 6 is a graph showing the voltage versus current crossover in the transistors of a two neuron network according to the present invention.

FIG. 7 is a simplified circuit drawing of the three middle neurons of a nine neuron network as described in detail to depict the manner in which neurons of the present invention within a network can be isolated for the production of localized winner-take-all decisions.

FIG. 8 is a graph showing the spatial response for increasing 15 in the network of FIG. 7.

FIG. 9 is a graph showing the logarithmic dependence of V5 on I5 in the network of FIG. 7.

FIG. 10 is a graph showing the spatial step response in the network of FIG. 7 and, in particular, showing the spatial derivative nature thereof.

DESCRIPTION OF THE PREFERRED EMBODIMENT

The circuitry to be described hereinafter has been fabricated by the inventors herein as a series of compact, completely functional CMOS integrated circuits which realize the winner-take-all function, using the full analog nature of the medium. The circuit in its various embodiments has been used successfully as a component in several VLSI sensory systems which perform auditory localization and visual stereopsis. Winner-take-all circuits with over 170 input correctly function in these sensory systems. As those skilled in the art will readily recognize and appreciate, the circuits shown hereinafter can be implemented as either n- or p-type components. Moreover, while they could be implemented as discrete components, in actuality such implementation would be impractical for anything but small test circuits. For meaningful computation capability, it is anticipated that any practical implementation will be accomplished using CMOS integrated technology, or the like, such as those built and tested by the inventors herein which form the basis of the description which follows hereinafter.

Figure 1:
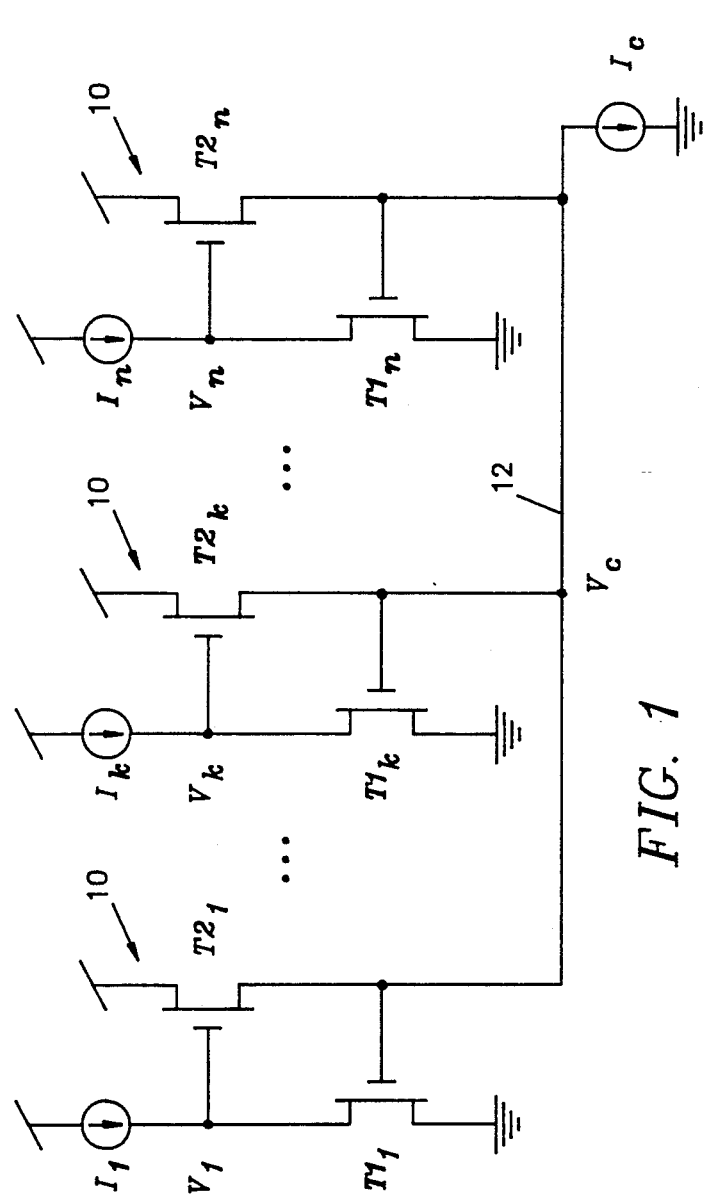
FIG. 1 is a simplified drawing of an n-neuron network according to the present invention.

A schematic diagram of the basic circuit is shown in FIG. 1, where each neuron path is generally indicated as 10. There are neurons 1-n, with neuron k being representative. Each neuron 10 receives a unidirectional current input $I_k$ which is the value upon which the winning decision is based. The output voltage $V_k$ of each neuron 10 represents the result of the winner-take-all computation. If $I_k = \max(I_1 \ldots I_n)$, then $V_k$ is a logarithmic function of $I_k$. If $I_j < < I_k$, then $V_j \sim 0$. A single wire 12, associated with the potential $V_c$, is used to compute the inhibition for the entire circuit. For an n neuron circuit, the wire 12 is O(n) long. To compute the global inhibition, each neuron k contributes a current onto the common wire 12, using transistor $T2_k$. To locally apply this global inhibition, each neuron k also responds to the common wire voltage $V_c$, using transistor $T1_k$. This computation is continuous in time as is characteristic of analog computations, i.e. no "clocks" are needed or used as in the case of binary computations. Further, the circuit comprising the n neurons 10 exhibits no hysteresis and operates with a time constant related to the size of the largest input. The output representation, $V_k$, of the circuit is not binary; that is, the "winning" output encodes the logarithm of its associated input.

Figure 2:
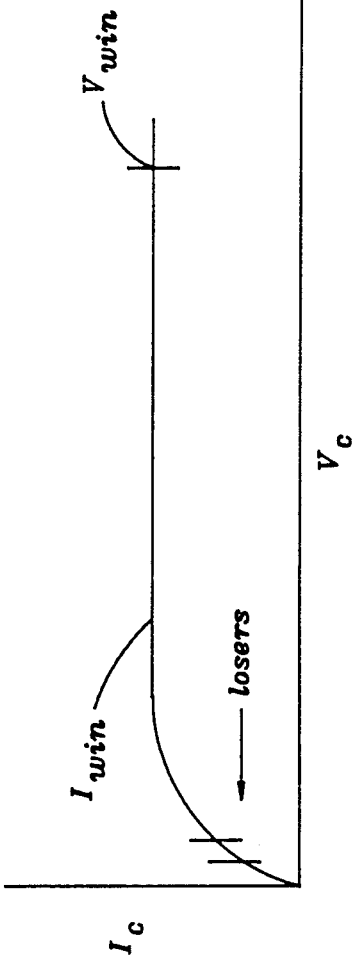
FIG. 2 is a graph of the voltage and currents of the various nodes in a neuron network according to the present invention and depicting the position of the "winning" neuron with respect to the "losers".

The operation of the winner-take-all neuron circuit of FIG. 1 is depicted graphically in FIG. 2. A single stage, i.e. neuron 10, is depicted in greater detail in FIG. 5. The T2 transistors are follower transistors having their source connected to the common wire 12 and, therefore, to the potential of $V_c$. The maximum value of $V_c$, $V_{max}$, is set by the value of $V_{bias}$. The T1 transistors are inhibitor transistors having their gate connected to the common wire 12 and, therefore, to the potential of $V_c$. The gate of each T2 transistor is connected to the drain of its associated T1 transistor and to the output of a current mirror 14 connected to the input signal of the neuron 10, $I_{in}$. $I_{in}$, therefore, is input to the gate of the T2 transistor and to the drain of the T1 transistor of the neuron 10. The current mirror 14 is not an inventive portion of the present invention; rather, it is a preferred manner of implementing the current input signal to each neuron 10. As mentioned above, the T2 transistors are each connected as followers. Thus, they set $V_c$ to the maximum of the $V_{out}$ values, since they can only source current; that is, $V_c$ becomes equal to $V_{out}$, i.e. $V_k$, from the neuron 10 having the highest $I_{in}$, i.e. $I_k$. Since the gates of the T1 transistors are connected to the common wire 12 and therefore $V_c$, all the T1 transistors other than the T1 transistor connected to the maximum $I_{in}$ (i.e. all except the winner) have a $V_{out}$ which is substantially zero. This is depicted in the graph of FIG. 2. As depicted therein, the $I_c$ curve rises exponentially to the current of the winner, $I_{win}$. The current of the non-winners is less than $I_{win}$ and, therefore, on the rise of the current curve. As a result, the output voltage, $V_{out}$, of the non-winning neurons 10 is virtually zero while the output voltage of the winning neuron, $V_{win}$, is way out on the current curve as depicted.

Figures 3, 4:
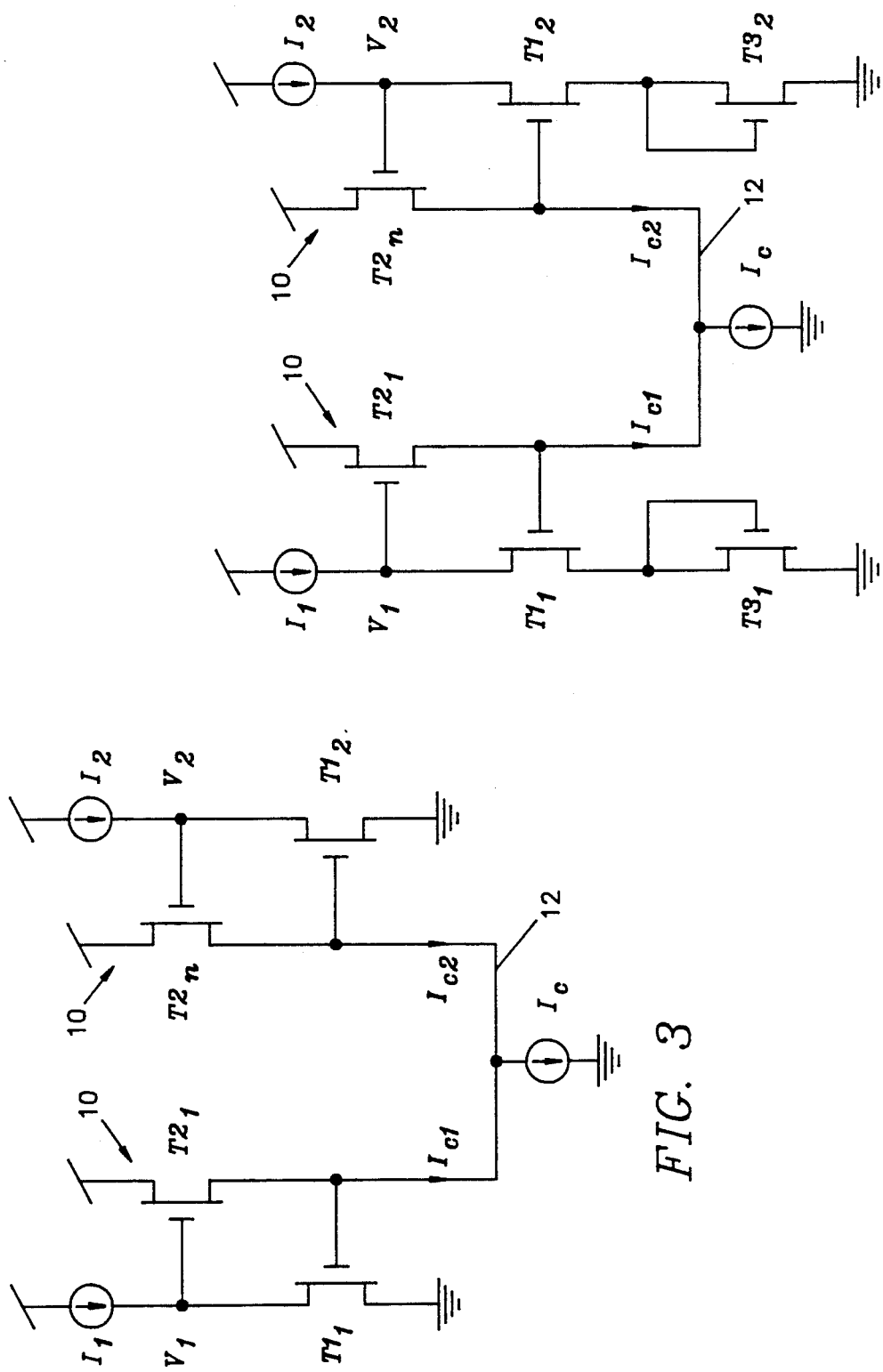
FIG. 3 is a simplified drawing of a two neuron network according to the present invention as employed in a mathematical analysis contained in the specification hereinafter.
FIG. 4 shows a modification to the network of FIG. 3 which can be employed to steepen the inhibition slope.

A static and dynamic analysis of the two neuron circuit of FIG. 3 further illustrates these properties, providing a closed form steady-state description of the inhibitory response, and showing the required conditions for stable circuit operation. To understand the behavior of the circuit, first consider the input condition $I_1 = I_2 = I_m$. Transistors $T1_1$ and $T1_2$ have identical potentials at gate and source, and are both sinking $I_m$; thus, the drain potentials $V_1$ and $V_2$ must be equal. Transistors $T2_1$ and $T2_2$ have identical source, drain, and gate potentials, and therefore must sink the identical current $I_{c1} = I_{c2} = I_c/2$. In the subthreshold region of operation, transistors $T1_1$ and $T1_2$ are therefore described by the equation $I_m = I_o \exp(V_c/V_o)$, where $I_o$ is a fabrication parameter and $V_o = kT/qk$. Likewise, transistors $T2_1$ and $T2_2$ are described by the equation $I_c/2 = I_o \exp((V_m - V_c)/V_o)$. Solving for $V_m(I_m, I_c)$ yields $$V_m = V_o \ln\left(\frac{I_m}{I_o}\right) + V_o \ln\left(\frac{I_c}{2I_o}\right).$$

Thus, for equal input currents, the circuit produces equal output voltages; which behavior is desirable for a winner-take-all circuit. In addition, the output voltage $V_m$ logarithmically encodes the magnitude of the input current $I_m$.

The inhibitory action of the circuit is illustrated by considering the input currents $I_1 = I_m + \delta_i$, $I_2 = I_m$. Transistor $T1_1$ is required to sink $\delta_i$ more current than in the previous example; as a result, the gate voltage of $T1_1$ rises. Transistors $T1_1$ and $T1_2$ share a common gate, however, and thus $T1_2$ is also biased to sink $I_m + \delta_i$. But only $I_m$ is present at the drain of $T1_2$. To compensate, the drain voltage of $T1_2$, $V_2$, must decrease. For small $\delta_i$'s, the Early effect serves to decrease the current through $T1_2$, decreasing $V_2$ linearly with $\delta_i$. For large $\delta_i$'s, $T1_2$ must leave saturation, driving $V_2$ to approximately zero volts. As desired, the output associated with the smaller input is suppressed. For large $\delta_i$'s, $I_{c2} \sim 0$, and $I_{c1} \sim I_c$. Transistor $T1_1$ is described by the equation $I_m + \delta_i = I_o \exp(V_c/V_o)$ and transistor $T1_2$ is described by the equation $I_c = I_o \exp((V_1/V_c)/V_o)$. Solving for $V_1$ yields $$V_1 = V_o \ln\left(\frac{I_m + o_i}{I_o}\right) + V_o \ln\left(\frac{I_c}{2I_o}\right).$$

The winning output encodes the logarithm of the associated input. The symmetrical circuit topology insures similar behavior for increases in $I_2$ relative to $I_1$.

FIG. 6 is a simplified plot of experimental data for a two neuron winner-take-all circuit showing the crossover transition between inhibitory and excitatory states. As can be shown from a mathematical analysis which is not included herein in the interest of simplicity, the inhibitory slopes of FIG. 6 are proportional to $V_e$, the Early voltage. The Early voltage of a MOS transistor is defined by the expression $$V_e = L \frac{\partial V_d}{\partial L},$$

where $V_d$ is the drain potential of the transistor and $L$ is the channel length of the transistor. Therefore, if the channel lengths of transistors $T1_1$ and $T1_2$ are decreased, the inhibitory output slopes of the circuit are also decreased. In the circuit associated with FIG. 6, the channel length of transistors $T1_1$ and $T1_2$ is 13.5 $\mu$m, the smallest allowable in the fabrication technology used. Steeper inhibitory slopes can be obtained by increasing the channel length of transistors $T1_1$ and $T1_2$. Alternatively, the inhibitory slopes can be increased through circuit modification. For example, for a given channel length, the circuit of FIG. 4 doubles the slope of the original circuit (through source degeneration of transistors $T1_1$ and $T1_2$) by the added diode-connected transistors $T3_1$ and $T3_2$. From experimental data it was found that the modified circuit of FIG. 4 has an equivalent $V_e$ of 46.2 volts while the original circuit of FIG. 3 has a $V_e$ of 24.9 volts.

As can readily be appreciated, the problem is not always one of finding the "winner" of all possible neurons. Often, the winner within a subgroup is the item of interest. To affect such a computational objective employing the basic circuit of the present invention, means must be provided for dividing the overall neuron network into meaningful subgroups. Fortunately, such a means exists as described in U.S. Pat. No. 4,786,818 of Nov. 22, 1988 entitled INTEGRATED SENSOR AND PROCESSOR FOR VISUAL IMAGES by Carver A. Mead et al. The teachings of that patent, which is assigned to the common assignee of this invention, are incorporated herein by reference. Disclosed therein is a non-linear resistor circuit implemented in CMOS which is particularly adapted to dividing an overall neuron network into meaningful subgroups as desired. Such a divided network in simplified form is shown in FIG. 7 which depicts the three center channels of a nine channel circuit. Each channel k has a unidirectional current input $I_k$ and a corresponding voltage output $V_k$. Unlike the general winner-take-all circuit as described above, each channel's inhibitory transistor, $T1_k$, is programmed by a distinct voltage, $V_{ck}$. Each inhibitory node is coupled to its nearest neighbors via the non-linear resistors 16 designated as $R_{k-1,k}$ and $R_{k,k+1}$, which contribute currents $I_{k-}$ and $I_{k+}$ to inhibitory node k. In addition, a constant, controllable current $I_c$ is subtracted from each inhibitory node. All the non-linear resistors 16 in the circuit are of constant value and are described by the equation $$I_{k+} = I_s \tan h(2(V_{ck} - V_{ck+1})/V_o),$$

where $V_o = kT/qk$ and $I_s$ is a controllable current. In summary, the circuit inputs a unidirectional current vector $I_1 \ldots I_n$ and outputs the voltage vector $V_1 \ldots V_n$, under the control of controllable currents $I_c$ and $I_s$. Using this notation, we can solve for the impulse response of the circuit. For example, employing the nine channel system shown in part in FIG. 7, with the input conditions $I_5 \gg I_{k=5}$ and $I_1 = \ldots = I_4 = I_6 \ldots I_9 \equiv I$, for a sufficiently large $I_5$, $V_{c5} \gg V_{c4}$ and $V_{c5} \gg V_{c6}$, and resistors $R_{45}$ and $R_{56}$ are saturated. Under these conditions, $V_{c5}$ is given by the definition of $T_{15}$, namely $$V_{c5} = V_o \ln(I_5/I_o),$$

where $I_o$ is a fabrication constant. The total amount of current going through transistor $T_{25}$ is $I_{5-} + I_{5+} + I_c$. Since $R_{45}$ and $R_{56}$ are saturated, this sum is simply $2I_s + I_c$. From the definition of $T_{25}$, we know $V_5 = V_o \ln(-(2I_s + I_c)/I_o) + Vc5$. Using the solution for $V_{c5}$ above yields the complete solution $$V_5 = V_o \ln((2I_s + I_c)/I_o) + V_o \ln(I_5/I_o).$$

So, for $I_5 \gg I_{k \neq 5}$, $V_5$ is logarithmically dependent on $I_5$ and independent of all $I_{k \neq 5}$. FIG. 8 depicts the spatial impulse response of a simulation of the nine channel network for varying $I_5$. Only those inputs satisfying $I_5 \gg I_{k \neq 5}$ are shown. The peaks of the output response of channel 5 are plotted versus impulse height in FIG. 9, showing a logarithmic relationship.

This solution can be extended to predict the behavior of $V_{k \neq 5}$ and $V_{ck \neq 5}$. As shown above, resistor $R_{45}$ must sink $I_s$. This current must be supplied by the current sources $I_c$ associated with earlier channels. Let $q = \text{Int}(I_s/I_c)$, where Int() is a function that returns the integer portion of a real number. If $q > 0$, channels $5-q$, $5-(q-1) \ldots 4$ will donate their entire current source $I_c$ to supply transistor $T_{25}$. As a result, transistors $T2_{5-q}$, $T2_{5-(q-1)}$ ... $T2_4$ will carry no current and $V_{5-q}$, $V_{5-(q-1)}$ ... $V_4 \sim 0$. The fractional remainder of $I_s$, namely $(q+1)I_c - I_s$, is carried by transistor $T2_{5-(q+1)}$. Recalling that $I_{k=5} = I$, we can, by using the definition of $T1_{5-(q+1)}$, state $V_{c5-(q+1)} = V_o \ln(I/I_o)$, and by using the definition of $T2_{5-(q+1)}$ and the above equation show $$V_{5-(q+1)} = V_o \ln(((q+1)I_c - I_s)/I_o) + V_o \ln(I/I_o).$$

For all channels $k < 5-(q+1)$, the input current I is carried by $T1_k$, and a full $I_c$ is carried by $T2_k$. The voltage $V_{ck}$ is therefore equal to $V_o \ln(I/I_o)$, and the voltage $V_k$ is equal to $V_o \ln(I_c/I_o) + V_o \ln(I/I_o)$. We now know the number of channels inhibited for given values of $I_b$ and $I_c$. It is interesting to note that if $I_5 >> I$, further increases in $I_5$ do not affect the inhibitory spread of the impulse function, only the peak height.

We now know the voltage $V_{ck}$ for all $k \leq 5-(q+1)$ and we know the current through each resistor $R_{5-(q+1),5-q}$ ... $R_{45}$. This knowledge can be used to calculate all $V_{ck}$ for $5-(q+1) < k < 5$. Symmetry requires the identical solution for $V_{k>5}$ and $V_{k<5}$. Thus, the spatial impulse response as a function of $I_c$ and $I_s$ is solved.

The most interesting thing about the results as described above which resulted from experiments and simulations conducted by the inventors herein is the implications for experiments using two active channels. If all channels have a small input I except for two larger current inputs $I_j$ and $I_i$, these currents cannot easily inhibit each other because there are always two directions for $T2_j$ and $T2_i$ to source current. With three tightly clustered inputs, however, the middle input is easily inhibited. Extrapolating to many inputs, this behavior implies the circuit takes a spatial derivative. FIG. 10 shows the results of a simulation of the spatial step response of the circuit, revealing the derivative action.

Wherefore, having thus described our invention, what is claimed is:

1. A neural computing circuit producing a single winner-take-all output at the "winning" circuit when a plurality of the circuits are simultaneously connected to a common line supplying current and producing a maximum voltage potential comprising:
   a) follower transistor means operably connected to the common line for sourcing current, said follower transistor means including gate means for connection to a current signal input source providing a current signal to each neural computing circuit to be compared to the said current signals at respective ones of the other neural computing circuits connected to the common line; and
   b) inhibitor transistor means having a gate operably connected to the common line and being operably connected to said gate means of said follower transistor means for providing a voltage output of the neural circuit at an output thereof and for inhibiting said voltage output at all neural computing circuits connected to the common line which have a said current signal which is smaller than the largest said current signal connected to one of the neural computing circuits.

2. The neural computing circuit of claim 1 and additionally comprising:
   non-linear resistor means for insertion into the common line between respective ones of a plurality of the neural computing circuits to limit current flow therebetween and thereby form subgroups of the neural computing circuits having a single "winner" within each said subgroup.

3. The neural computing circuit of claim 1 and additionally comprising:
   slope limiting transistor means diode-connected in series with said inhibitor transistor means for limiting the slope of said voltage output from said inhibitor transistor means.

4. A neural computing network including a plurality of neural circuits and producing a single winner-take-all output at the "winning" circuit comprising:
   a) a common line supplying current and producing a maximum voltage potential; and wherein each neural circuit comprises,
   b) follower transistor means operably connected to said common line for sourcing current, said follower transistor means including gate means for connection to a current signal input source providing a current signal to each neural circuit to be compared to the said current signals at respective ones of the other neural circuits; and,
   c) inhibitor transistor means having a gate operably connected to said common line and being operably connected to said gate means of said follower transistor means for providing a voltage output of the neural circuit at an output thereof and for inhibiting said voltage output at all neural circuits connected to said common line which have a said current signal which is smaller than the largest said current signal connected to one of the neural circuits.

5. The neural computing network of claim 4 and additionally comprising:
   a plurality of non-linear resistor means disposed in said common line between respective ones of the neural circuits for limiting current flow therebetween and thereby forming subgroups of the neural circuits having a single "winner" within each said subgroup.

6. The neural computing network of claim 4 and additionally comprising:
   slope limiting transistor means diode-connected in series with said inhibitor transistor means for limiting the slope of said voltage output from said inhibitor transistor means.

7. An analog circuit comprising a plurality of nodes for simultaneously computing the largest of a plurality of signals at inputs of respect ones of the nodes comprising:
   a) a common line supplying current and producing a maximum voltage potential; and,
   b) a plurality of nodes connected to said common line wherein each node comprises,
      b1 follower transistor means operably connected to said common line for sourcing current, said follower transistor means including gate means being the input of said node for connection to a current signal input source providing a current signal to each node to be compared to the said current signals at respective ones of the other nodes connected to said common line; and,
      b2) inhibitor transistor means having a gate operably connected to said common line and being operably connected to said gate means of said follower transistor means for providing a voltage output of the node at an output thereof and for inhibiting said voltage output at all nodes connected to said common line which have a said current signal which is smaller than the largest said current signal connected to one of the nodes.

8. The analog circuit of claim 7 and additionally comprising:
a plurality of non-linear resistor means disposed in said common line between respective ones of the nodes for limiting current flow therebetween and thereby forming subgroups of the nodes having a single "winner" within each said subgroup.

9. The analog circuit of claim 7 and additionally comprising:
slope limiting transistor means diode-connected in series with said inhibitor transistor means for limiting the slope of said voltage output from said inhibitor transistor means.

10. A CMOS analog integrated circuit comprising a plurality of nodes for simultaneously computing the largest of a plurality of signals at inputs of respect ones of the nodes comprising:
a) a common line supplying current and producing a maximum voltage potential; and,
b) a plurality of nodes connected to said common line wherein each node comprises,
b1) a follower transistor having a source operably connected to said common line for sourcing current, said follower transistor including a gate being the input of the node and being connected to a current signal input source providing a current signal to the node to be compared to the said current signals at respective ones of the other nodes; and,
b2) an inhibitor transistor having a gate connected to said common line and a drain operably connected to said gate of said follower transistor, said inhibitor transistor providing a voltage output of the node at an output thereof and inhibiting said voltage output at all nodes connected to said common line which have a said current signal which is smaller than the largest said current signal connected to one of the nodes.

11. The CMOS analog integrated circuit of claim 10 and additionally comprising:
a plurality of non-linear resistors disposed in said common line between respective ones of the nodes for limiting current flow therebetween and thereby forming subgroups of the nodes having a single "winner" within each said subgroup.

12. The CMOS analog integrated circuit of claim 10 and additionally comprising:
a slope limiting transistor diode-connected in series with said inhibitor transistor to limit the slope of said voltage output from said inhibitor transistor.

* * * * *